3,575,939
STIFF, WORKABLE POLYAMIDES BY BLENDING WITH CYANURIC ACID
Rajindar K. Kochhar, Overland Park, Kans., Harry D. Anspon, Sewickley, Pa., and Bert H. Clampitt, Overland Park, Kans., assignors to Gulf Research & Development Company, Pittsburgh, Pa.
No Drawing. Filed June 4, 1968, Ser. No. 734,245
Int. Cl. C08g 20/38
U.S. Cl. 260—78                                    3 Claims

ABSTRACT OF THE DISCLOSURE

Several polymers of nylon have lower melt viscosity and higher stiffness values with no appreciable sacrifice in other properties when blended with small amounts of cyanuric acid.

BACKGROUND OF THE INVENTION

This invention relates to a composition and method of improving stiffness and melt viscosity of several different nylon polymers by blending a major portion of the polyamide with a minor portion of cyanuric acid in conventional blending apparatus.

Many attempts have been made to improve stiffness of poly ε-caprolactam and other polyamides without sacrificing other properties, such as processability. Stiffness can be improved by post-polymerization to increase molecular weight, but such treatment has always resulted in a product which is hard to process on the usual plastic forming equipment such as extruders. Plasticizers or lubricants can be added, but this reduces stiffness, increases elongation, and presents problems of exudation of plasticizer.

It is known to prepare a polyamide containing the cyanuric acid moiety chemically bonded to a nitrogen atom along the polyamide chain, such as by reacting polyamide with a solution of cyanuric chloride, then hydrolyzing the product with caustic soda. However, applicants prepare a physical blend.

It is also known to blend polyamides with carboxylic acids.

SUMMARY

It has been found that by blending a major portion of poly ε-caprolactam and other polyamides with a minor portion of cyanuric acid that the blended composition has improved stiffness and lower melt viscosity than unblended poly ε-caprolactam or other polyamides without any substantial loss in other properties. With some polyamides, as flexural stiffness is increased by the cyanuric acid, there may be some decrease of tensile strength at break, as indicated at Tables I, II, and IV. However, other polyamides show an increase in tensile strength at break up to some maximum value, followed by a decline in tensile strength as more cyanuric acid is added to the blend. This is illustrated in Table III. In all instances tensile strength at break remains relatively high. The polyamide-cyanuric acid blend can be processed in conventional plastic forming apparatus, such as extruders.

PREFERRED EMBODIMENTS

The preferred embodiments of this invention are illustrated by the following examples.

EXAMPLE 1

Phosphoric acid initiated poly ε-caprolactam (nylon 6) was blended with the amounts of cyanuric acid shown in Table I in a Brabender Plasti-Corder at 235° C. under a blanket of dry nitrogen gas. The cold mass was ground to a coarse powder in a Wiley mill. Blending conditions and the results of various tests are reported in Table I.

Melt flow index was measured according to ASTM D1238–65T, FR–R; stiffness properties were determined by ASTM D747–63 and tensile tests were run according to ASTM D638–64T. All the physical tests were run at a room temperature of 24° C. and a relative humidity of 40–50 percent. All the samples were stored in a desiccator with calcium chloride for 72 hours before conducting the tests.

TABLE I.—PHYSICAL PROPERTIES OF NYLON 6 AND CYANURIC ACID BLENDS

| Cyanuric acid, percent weight | Plasti-Corder conditions | | M.F.I.,* ° C. | Tensile strength at break, p.s.i. | Flexural stiffness |
|---|---|---|---|---|---|
| | Temp., ° C. | Time, min. | | | |
| Sample: | | | | | |
| 1 | 0 | 235 | 15 | 0.40 | 11,760 | 176,000 |
| 2 | 2 | 235 | 15 | 7.97 | 7,242 | 177,109 |
| 3 | 5 | 235 | 15 | 43.24 | 9,242 | 190,994 |
| 4 | 10 | 235 | 15 | 62.64 | 9,073 | 213,868 |

*Melt flow index.

EXAMPLE 2

A higher melt flow index poly ε-caprolactam (nylon 6) was mixed with cyanuric acid according to the method described in Example 1. The blends were then subjected to thermal and physical test according to procedure in Example 1. Results of various tests and the blending conditions are described in Table II.

TABLE II.—PHYSICAL PROPERTIES OF NYLON 6 AND CYANURIC ACID BLENDS

| Cyanuric acid, percent weight | Plasti-Corder conditions | | M.F.I.,* ° C. | Tensile strength at break, p.s.i. | Flexural stiffness |
|---|---|---|---|---|---|
| | Temp., ° C. | Time, min. | | | |
| Sample: | | | | | |
| 1 | 0 | 235 | 15 | 5.96 | 12,332 | 174,216 |
| 2 | 2 | 235 | 15 | 23.31 | 11,323 | 203,843 |
| 3 | 5 | 235 | 15 | 41.44 | 9,507 | 204,857 |
| 4 | 10 | 235 | 15 | 55.14 | 8,373 | 220,426 |

*Melt flow index.

EXAMPLE 3

Table III contains a list of blends prepared using nylon 610 and cyanuric acid. The trend in melt viscosity and stiffness rise are visible in this case also. Melt flow index and their physical tests were run according to ASTM procedures given in Example 1.

TABLE III.—PHYSICAL PROPERTIES OF NYLON 610 AND CYANURIC ACID BLENDS

| Cyanuric acid, percent weight | Plasti-Corder conditions | | M.F.I.,* ° C. | Tensile strength at break, p.s.i. | Flexural stiffness |
|---|---|---|---|---|---|
| | Temp., ° C. | Time, min. | | | |
| Sample: | | | | | |
| 1 | 0 | 235 | 15 | 69 | 6,636 | 141,384 |
| 2 | 1 | 235 | 15 | 114 | 6,998 | 184,657 |
| 3 | 5 | 235 | 15 | 111 | 9,198 | 206,382 |
| 4 | 10 | 235 | 15 | 105 | 8,179 | 196,470 |
| 5 | 20 | 235 | 15 | 112 | 7,664 | 200,294 |

*Melt flow index.

EXAMPLE 4

Nylon 12 and cyanuric acid were blended together in a Brabender Plasti-Corder at a temperature of 190° C. and under a blanket of dry nitrogen. The cold mass was pulverized and injection molded into suitable samples for physical testing which were run according to ASTM procedure described in Example 1. Melt flow index of the product was measured by ASTM D1238–65T, FR–E. A continuous rise in the stiffness value is observed with increasing amounts of cyanuric acid in the blend. A slight fall in the melt flow indices of the blends is also observable.

TABLE IV.—PHYSICAL PROPERTIES OF NYLON 12 AND CYANURIC ACID BLENDS

| | Cyanuric acid, percent weight | Plasti-Corder conditions | | M.F.I.,* ° C. | Tensile strength at break, p.s.i. | Flexural stiffness |
|---|---|---|---|---|---|---|
| | | Temp., ° C. | Time, min. | | | |
| Sample: | | | | | | |
| 1 | 0 | 190 | 5 | 12.7 | 7,954 | 101,839 |
| 2 | 1 | 190 | 5 | 13.6 | 8,062 | 104,271 |
| 3 | 5 | 190 | 5 | 9.7 | 6,749 | 117,115 |
| 4 | 10 | 190 | 5 | 10.5 | 5,675 | 123,904 |
| 5 | 20 | 190 | 5 | 7.3 | 4,958 | 153,399 |

*Melt flow index.

Nylon 6, nylon 12 and nylon 610 can be made more stiff and workable by adding 0.01 to 25% or 0.1 to 25% (by weight) cyanuric acid, better properties result if 1 to 20% (by weight) cyanuric acid is added to the polyamide, and the preferred range is 2 to 15% cyanuric acid added based on the weight of polyamide. Blends of nylon 6 and nylon 610 are made at preferred temperatures between 200 and 300° C. while blends of nylon 12 are made at preferred temperatures between 170 and 280° C. In addition to blending both components in the molten state, as in the previous examples, cold cyanuric acid can be blended into molten nylon, by known methods.

Following are the generic terms for the various nylon polymers:

Nylon 6—Poly-ε-caprolactam,
Nylon 610—Condensation product of hexamethylenediamine with sebacic acid,
Nylon 12—Poly-12-aminododecanoic acid.

What is claimed is:

1. A stiff workable polyamide composition consisting of a major portion of a polyamide selected from the group consisting of poly-ε-caprolactam, polyhexamethylene-sebacamide and poly-12-aminododecanoic acid, blended with a minor portion between .1 and 25% of cyanuric acid based on the weight of said polyamide.

2. The composition of claim 1 wherein the minor portion of cyanuric acid is 1 to 20% based on the weight of said polyamide.

3. The composition of claim 1 wherein the minor portion of cyanuric acid is 2 to 15% based on the weight of said polyamide.

References Cited

UNITED STATES PATENTS 2,374,069  4/1945  Balthis _____ 260—78
3,448,085  6/1969  Pietrusza et al. _____ 260—78

HAROLD D. ANDERSON, Primary Examiner

REEXAMINATION CERTIFICATE (1057th)
United States Patent [19]
Eichman

[11] B1 3,575,939
[45] Certificate Issued May 23, 1989

[54] FRAME STRUCTURE FOR GLASS OR SOLID PANEL WALLS

[76] Inventor: Ellis V. Eichman, 790 Fruitdale Rd., Brownsville, Tex. 78520

Reexamination Request:
No. 90/000,841, Aug. 22, 1985

Reexamination Certificate for:
Patent No.: 3,575,939
Issued: May 25, 1971
Appl. No.: 867,230
Filed: Oct. 17, 1969

[51] Int. Cl.⁴ .................................................. E04B 2/88
[52] U.S. Cl. ......................................... 52/397; 52/235; 52/476; 52/732
[58] Field of Search .................. 52/235, 731, 397, 476

[56] References Cited
U.S. PATENT DOCUMENTS

| | | |
|---|---|---|
| 3,147,518 | 9/1964 | Horgan . |
| 3,267,629 | 8/1966 | Waring et al. . |
| 3,352,078 | 11/1967 | Neal . |
| 3,403,491 | 10/1968 | Eichman . |
| 3,471,985 | 10/1969 | Lindelow .............................. 52/731 |

OTHER PUBLICATIONS

Cupples Aluminum Curtain Wall, 1967, p. 11.
Cupples Aluminum Curtain Wall, 1968, p. 11.
Kawneer Muntin and Mullion, Jun. 1, 1957.
Kawneer Fronts and Facings, Jan., 1968.

*Primary Examiner*—John E. Murtagh

[57] ABSTRACT

A frame structure for glass or solid wall panels providing for the arrangement of the glass or other type panels in a common plane an in such manner as to prevent lateral movement thereof due to vibrations caused by traffic movement, wind pressures, and other factors, minimizing the framing profile and the number of parts comprising the structure by providing a single frame element and panel retention means of unique design for fabricating all parts of a frame structure.

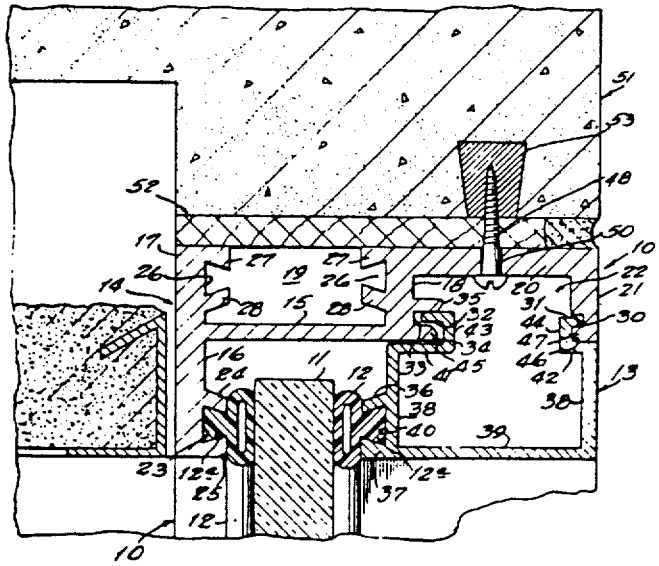

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–8 are cancelled.

\* \* \* \* \*